United States Patent
Michishita

Patent Number: 6,151,159
Date of Patent: Nov. 21, 2000

[54] OPTICAL AMPLIFIER FOR WAVELENGTH MULTIPLEX TRANSMISSION

[75] Inventor: Yukio Michishita, Tokyo, Japan

[73] Assignee: NEC Corporation, Tokyo, Japan

[21] Appl. No.: 09/136,003

[22] Filed: Aug. 18, 1998

[30] Foreign Application Priority Data

Aug. 18, 1997 [JP] Japan ................................. 9-220558

[51] Int. Cl.$^7$ ............................ H01S 3/00; H01S 3/0933
[52] U.S. Cl. ........................................ 359/341; 359/124
[58] Field of Search .................................. 359/134, 124, 359/341

[56] References Cited

U.S. PATENT DOCUMENTS

| | | | |
|---|---|---|---|
| 5,896,221 | 4/1999 | Saeki ........................................ | 359/341 |
| 6,008,935 | 12/1999 | Fujita et al. ............................ | 359/341 |
| 6,038,062 | 3/2000 | Kosaka .................................... | 359/337 |

FOREIGN PATENT DOCUMENTS 7-193542  7/1995  Japan .

*Primary Examiner*—Mark Hellner
*Attorney, Agent, or Firm*—Scully, Scott, Murphy & Presser

[57] ABSTRACT

An optical amplifier for wavelength multiplex transmission is capable of reducing the gain difference of each wavelength. A pumping light source generates pumping lights to excite an optical fiber for amplification for amplifying wavelength multiplexed optical signals, a wavelength optical multiplexer inserts these pumping lights to the optical fiber for amplification, an optical coupler branches the optical signals amplified by the optical fiber for amplification, and a wavelength separator separates the branched optical signals into ASE and signal lights. A photo receiver detects the strength of separated ASE, a photo detector detects the strength of signal light. A strength level comparator/pumping light source controller controls the output of the pumping light source, based on the strength detected by the photo detector so that the output level of the optical signal is set arbitrary. Therefore, by controlling the output level of the pumping light source, it is capable of setting the amplification factor of suitable gain flatness.

7 Claims, 5 Drawing Sheets

OPTICAL AMPLIFIER FOR WAVELENGTH MULTIPLEX TRANSMISSION

BACKGROUND OF THE INVENTION

The present invention relates to an optical amplifier for wavelength multiplex transmission, in particular, to a detection of strength of optical signals and a detection of null signals (alternatively referred to herein as silent signals) in wavelength multiplex transmission.

DESCRIPTION OF THE RELATED ART

In the conventional optical amplifier for wavelength multiplex transmission, generally, a wavelength multiplex transmission system transmitting different wavelength lights at the same time is supposed to be ideal. Recently, many research institutes drive forward to practically use a wavelength multiplex transmission technology transmitting different wavelength lights at the same time, as the communication system of ultra speed and large capacity. In a relay transmission of this wavelength multiplex signals, an optical amplifier applying a control method in which the difference of signal light level is not generated by the wavelength dependency of gain has been studied.

FIG. 1 shows a conventional example 1, FIG. 2 shows a conventional example 2, of the constitution of optical amplifier which has wavelength dependency of amplification factor. These optical amplifiers comprise a rare-earth additive fiber 101, an optical coupler 102, WDM (wavelength division multiplexing coupler) optical multiplexer 103, a pumping light source 104, an optical isolator 105, a cutoff filter of pumping light source 106, a signal light input 107, a signal light output 108, a photo detector 109, a strength level comparator/pumping light source controller 110 and a cutoff filter of signal light 111.

According to the optical amplifiers of the above mentioned conventional examples 1 and 2, the optical amplifier amplifying inputted lights $\lambda 1 \sim \lambda n$ by the excitation of the optical fiber for amplification by the pumping light source 104, monitors ASE (amplified spontaneous emission) emitted from the optical amplifier and obtains the wavelength dependency of a certain level of gain, by controlling the strength of ASE in a certain level.

For example, a conventional example 3 of the Japanese Patent Laid-Open Publication No. 7-193542 "Optical Amplifying Device, Optical Amplifier Designing Method and Optical Fiber Relay Transmission System" comprises a photo detector detecting the strength level of excessive noise light generated from rare-earth additive optical fiber and a means controlling variably the quantity of light emission for pumping by comparing the strength level of excessive noise light with the predetermined strength level being set to obtain an appointed dependency of amplification factor and making the strength level the same. According to this constitution, even when the input strength level of input signal light is changed, the wavelength dependency of amplification factor is capable of being maintained in a certain level. Additionally it is also capable of changing the required amplification factor. In accordance with these, it is said that the conventional system is applicable for multi-wavelength multiplex optical network system, multi-wavelength multiplex relay transmission system and low distortion analog optical communication and so on.

However, the above mentioned conventional wavelength multiplex transmission adopts a controlling method that a gap of wavelength dependency of gain does not occur and does not detect the strength of optical signal and silent signal. Therefore there is a problem that restraint of occurrence of gain difference in each wavelength is not considered.

SUMMARY OF THE INVENTION

It is therefore an object of the present invention to provide an optical amplifier for wavelength multiplex transmission which makes the reduction of gain difference in each wavelength possible.

In order to achieve this object, the present invention of an optical amplifier for wavelength multiplex transmission comprises an optical fiber 1 for amplification for amplifying optical signals of wavelengths $\lambda 1 \sim \lambda n$ (n is an integer greater than 0) which are wavelength multiplexed, a pumping light source 4 for generating pumping lights to excite the optical fiber for amplification, a wavelength optical multiplexer 3 for inserting the pumping lights to the optical fiber for amplification, an optical coupler 2 for branching the amplified optical signals by the optical fiber for amplification, a wavelength separator 12 for separating both ASE (amplified spontaneous emission) which are generated spontaneously by the optical fiber for amplification and signal lights of signal wavelength from the branched optical signals, a photo receiver 13 for detecting the strength of the ASE, a photo detector 9 for detecting the strength of the signal lights and a strength level comparator/pumping light source controller 10 which controls the output of pumping light source to have the output level of the optical signals set arbitrarily, based on the strength detected by the photo detector. The optical amplifier for wavelength multiplex transmission is capable of controlling the output level of the pumping light source, by the strength level comparator/pumping light source controller so as to have an amplification factor with a suitable gain flatness.

Additionally, according to the strength detected from the photo detector 9, the strength level comparator/pumping light source controller 10 is capable of detecting the strength level of an optional wavelength light signal.

Furthermore, the optical amplifier for the wavelength multiplex transmission includes a silent signal detector 14 for detecting the silent, or null state, which is capable of detecting a silent signal of an optional wavelength.

And a silent signal detection of an optional wavelength is a silent signal detection of the ASE, the strength level comparator/pumping light source controller 10 controls the output level of the pumping light source, so as to have an amplification factor with a suitable gain flatness of the optical fiber for amplification.

And an optical amplifier for wavelength multiplex transmission includes at least two of each the wavelength separator 12 of different wavelength characteristics and the photo receiver 13, which is capable of reducing the gain difference of each different wavelength.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

DESCRIPTION OF THE PREFERRED EMBODIMENTS

Figure 1:
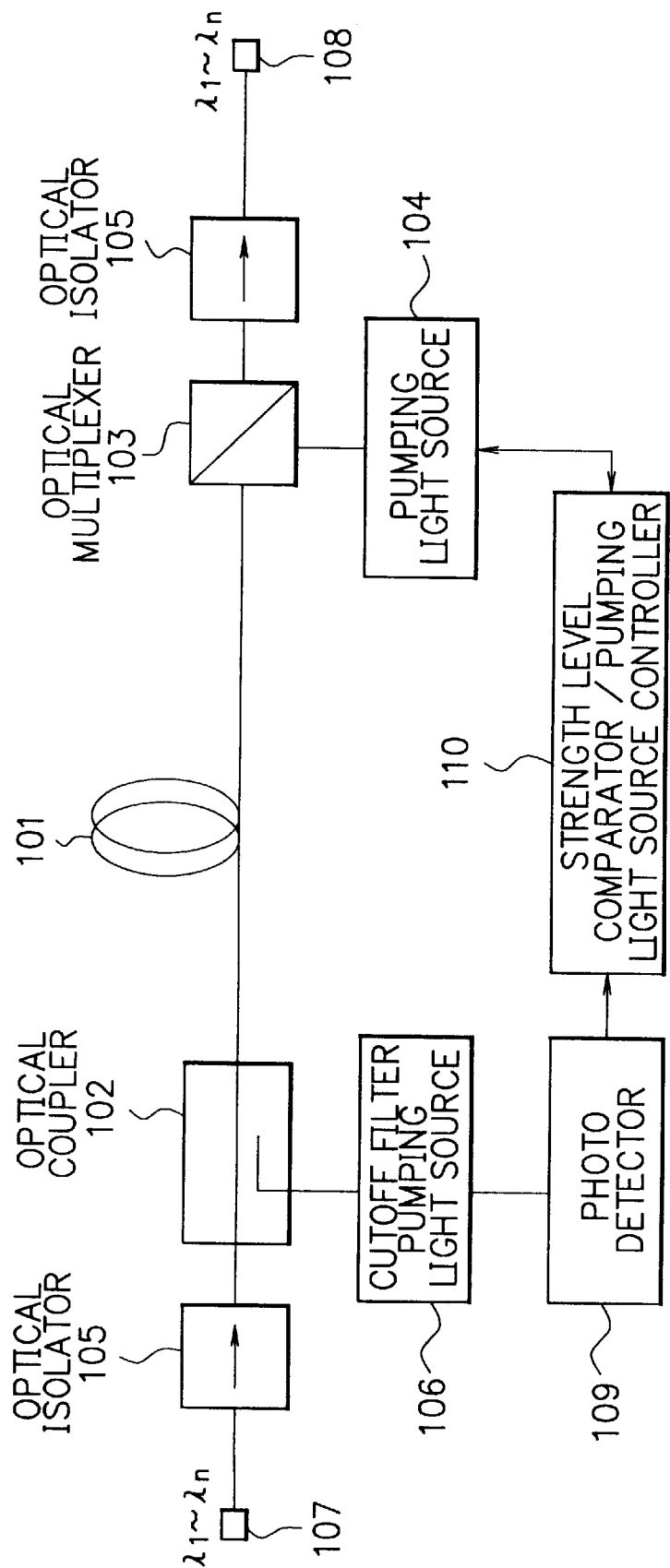
FIG. 1 is a block diagram showing the construction of a first example of the conventional optical amplifier.
Figure 2:
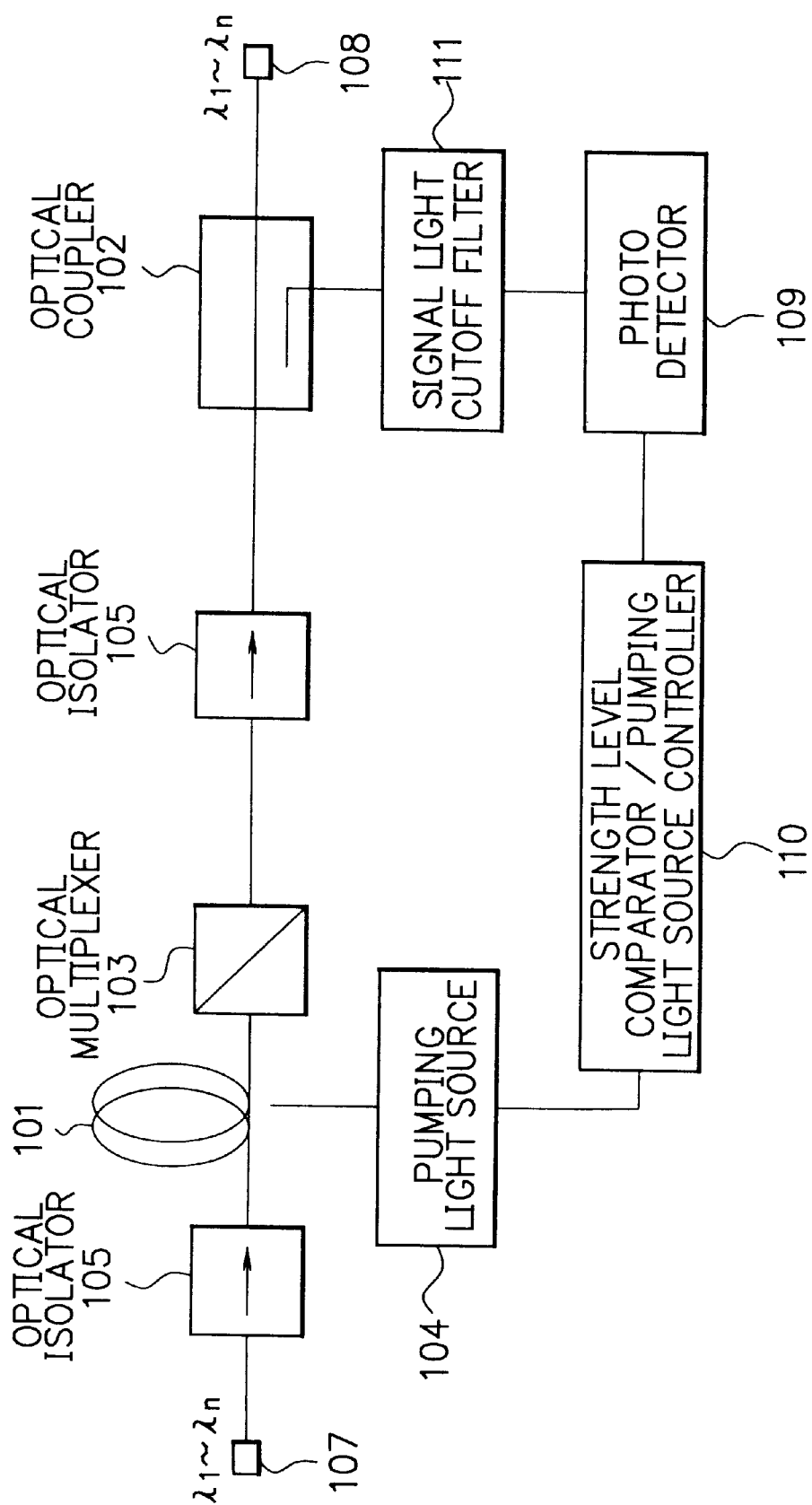
FIG. 2 is a block diagram showing the configuration of a second example of the conventional optical amplifier.
Figure 3:
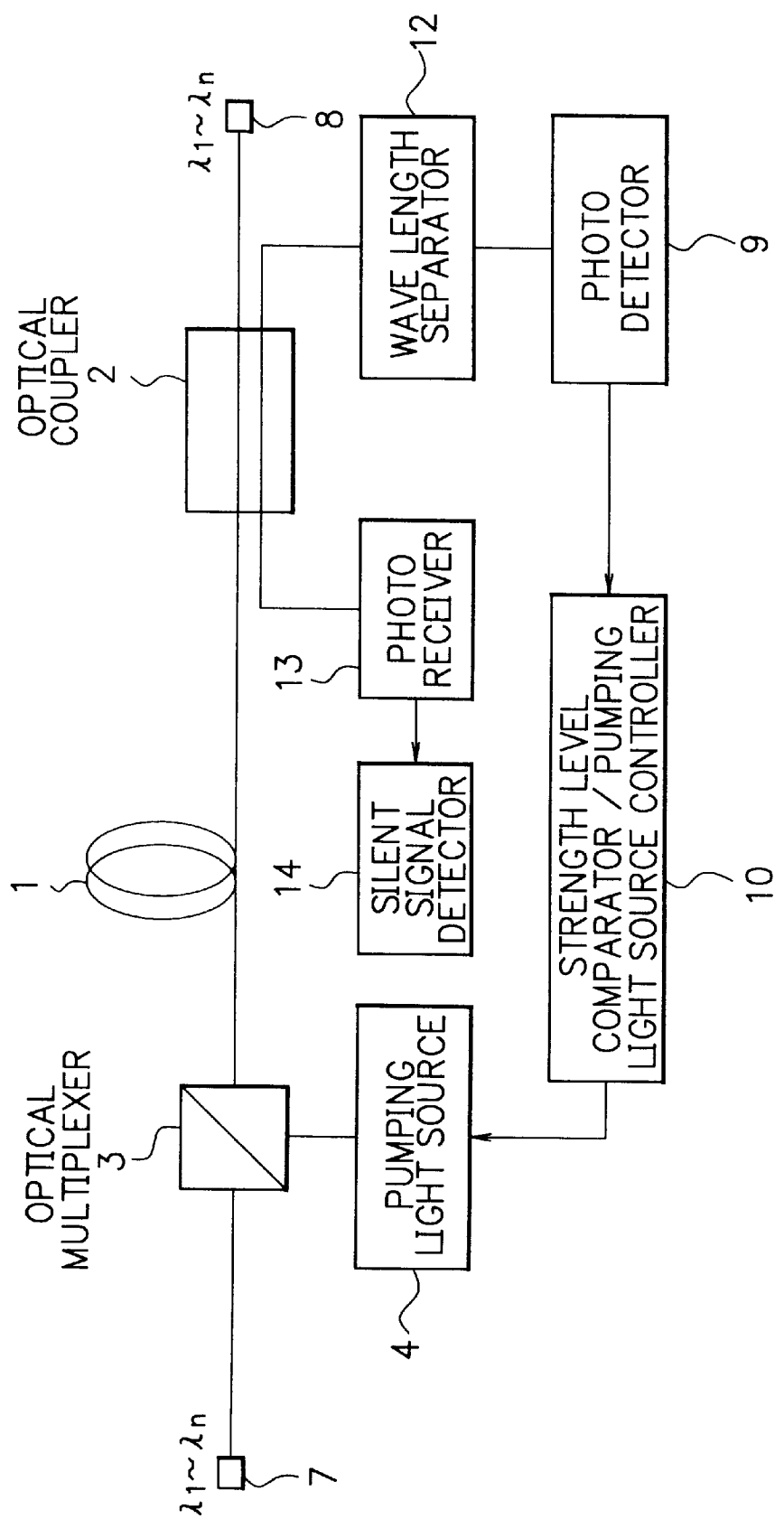
FIG. 3 is a block diagram showing the constitution of a first embodiment of the optical amplifier for wavelength multiplex transmission in accordance with the present invention.
Figure 4:
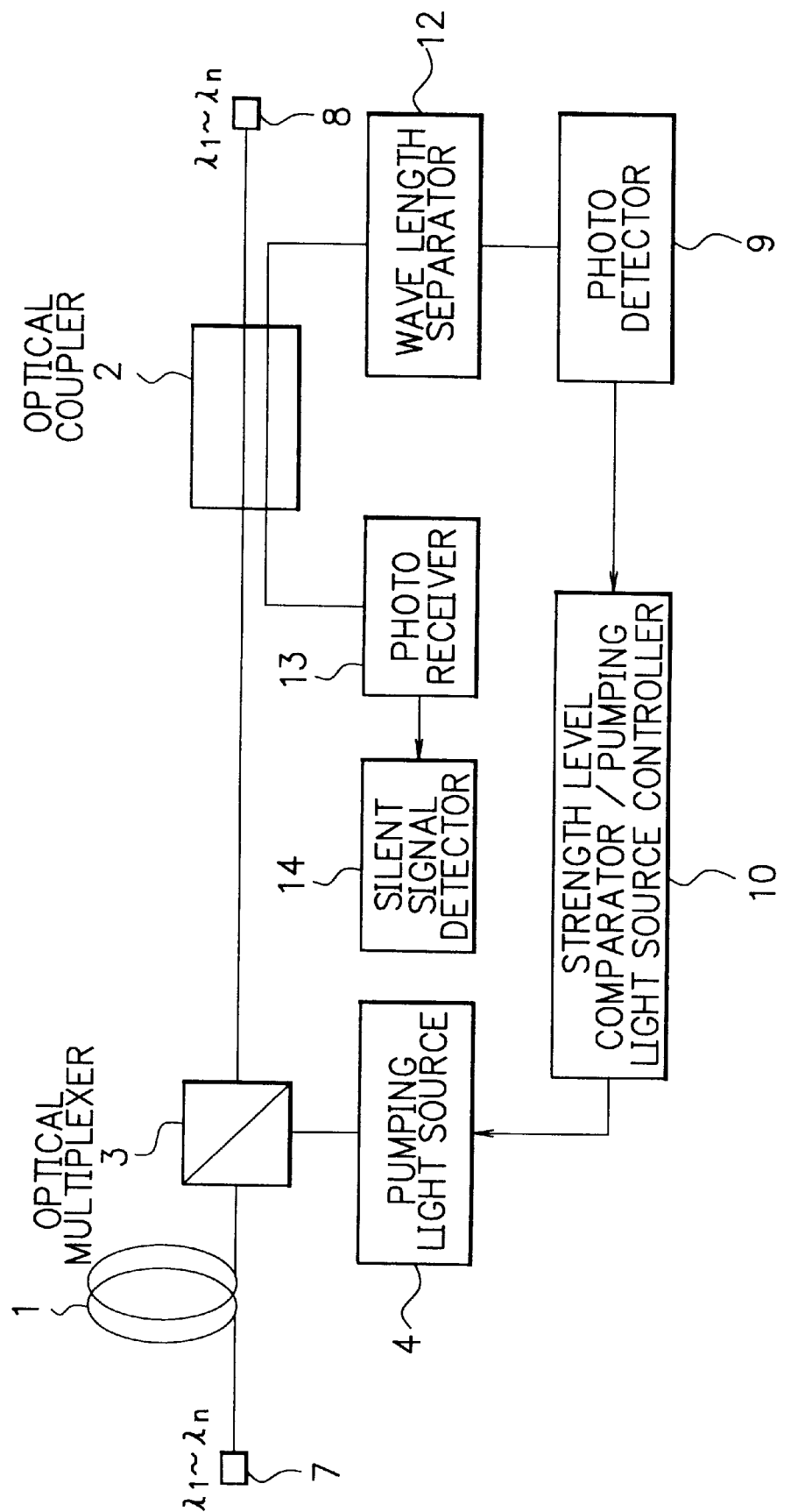
FIG. 4 is a block diagram showing the structure of a second embodiment of the optical amplifier for wavelength multiplex transmission in accordance with the present invention.
Figure 5:
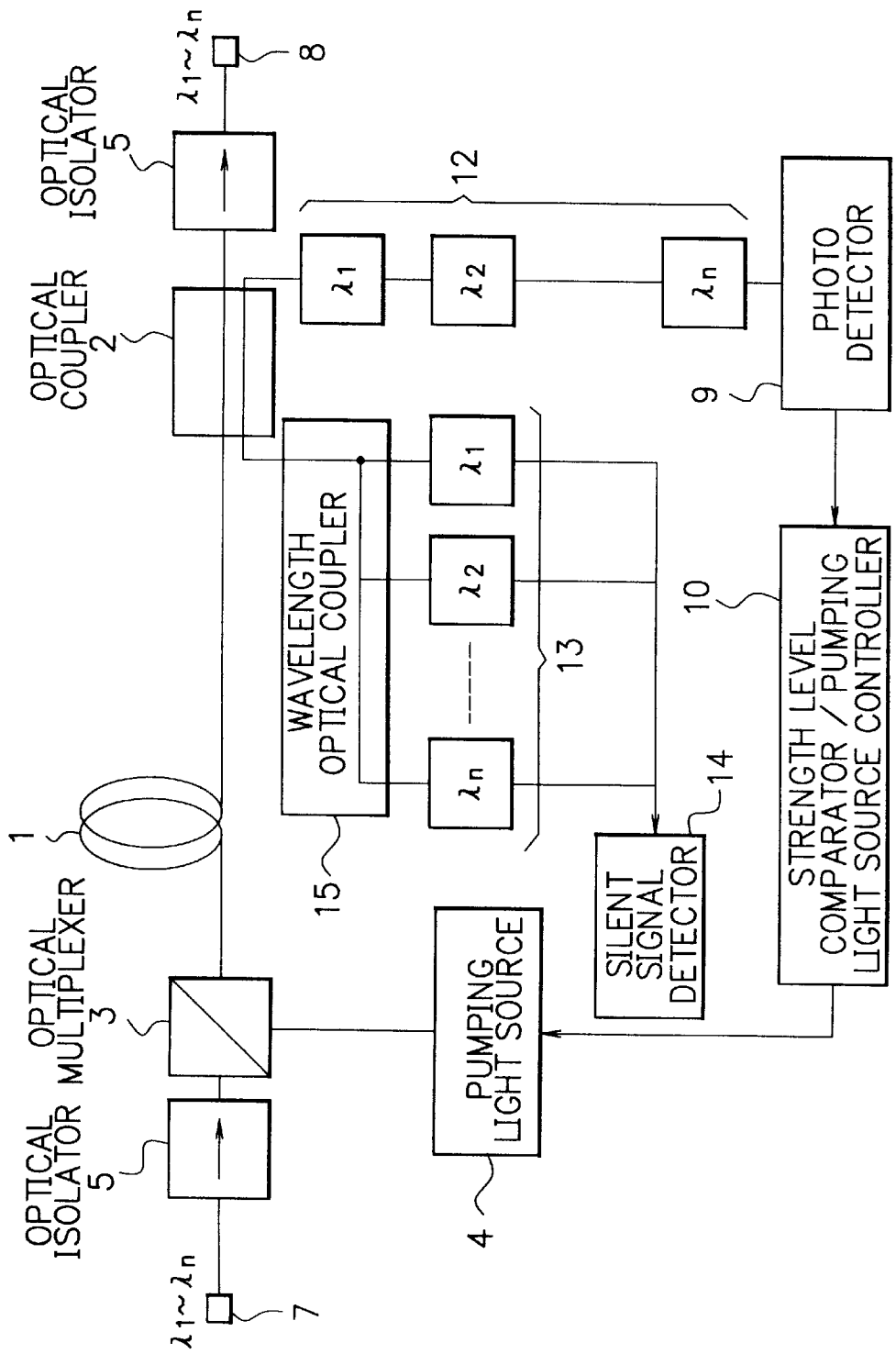
FIG. 5 is a block diagram showing an application of the optical amplifier for wavelength multiplex transmission in accordance with the present invention.

A preferred embodiment of the present invention will now be described in detail referring to the accompanying drawings. FIGS. 3, 4 and 5 show embodiments of the optical amplifier for wavelength multiplex transmission in accordance with the present invention.

FIG. 3 is a first embodiment of the optical amplifier in accordance with the present invention and FIG. 4 is a second embodiment of the optical amplifier in accordance with the present invention. This second embodiment shows a circuit of optical amplifier of pumping from back side.

The present invention comprises an optical fiber 1 for amplification, an optical coupler 2, WDM (wavelength division multiplexing coupler) optical multiplexer 3, a pumping light source 4, a signal light input 7, a photo detector 9, a strength level comparator/pumping light source controller 10, a fiber grating F.G (wavelength separator) 12, a photo receiver 13 and a silent signal detector 14.

The above mentioned optical fiber for amplification 1 is an optical fiber to amplify a signal light. A rare-earth additive fiber is used in this embodiment. The optical coupler 2 branches the amplified signal. The WDM coupler; optical multiplexer 3 is a wavelength multiplexer for inputting the pumping light excited by the pumping light source 4 to the optical fiber 1. The pumping light source 4 excites the optical fiber 1. The photo detector 9 monitors the reflected signal light from F.G (wavelength separator) 12.

The strength level comparator/pumping light source controller 10 controls the pumping light to be a certain level of the strength of monitored ASE (amplified spontaneous emission). The fiber grating F.G (wavelength separator) 12 is a passing light selector having characteristics which reflect the signal light and pass the other wavelength lights. The photo receiver 13 monitors ASE (amplified spontaneous emission) generated from the optical fiber for amplification. The silent signal detector 14 detects the silent signal state resulted from monitoring ASE at the photo receiver 13.

In the optical amplifier for wavelength multiplex transmission comprising the above mentioned parts, the optical signals multiplexed by the wavelengths λ1~λn inputted from the signal light input 7 are excited and amplified by the pumping light source 4 in the optical fiber 1 for amplification. The amplified optical signals are branched by the optical coupler 2. The branched optical signals except for signal light wavelength are passed by F.G (wavelength separator) 12 and ASE are inputted to the photo detector 9.

Based on the information of detected ASE level in the photo detector 9, the output level of the pumping light source 4 is controlled by the strength level comparator/ pumping light source controller 10, to have the amplification factor with better or even the best gain flatness of the optical fiber for amplification. By this process, the optical amplification minimizing the difference of gain of each wavelength is implemented. The signal light reflected from F.G (wavelength separator) 12 is inputted to the photo receiver 13 for signal light monitor and it is capable of detecting the optical signal. Furthermore, it is capable of detecting a silent signal by the silent signal detector 14.

FIG. 5. is a block diagram showing an application of the optical amplifier for wavelength multiplex transmission in accordance with the present invention. The basic structure of this application of the optical amplifier is the above mentioned first embodiment of the optical amplifier. That is, comparing with the first embodiment of the optical amplifier, optical isolators 5 at the input/output stage of the optical fiber 1 for amplification, a fiber grating F.G (wavelength separator) 12 fitting each wavelength for wavelength multiplex light detection respectively at before and behind stages of the separated signal by the optical coupler, a photo receiver 13 and a wavelength optical coupler 15 are added.

In this application, the optical signals of multiplexed wavelengths λ1~λn inputted from the signal light input 7 are amplified by the optical fiber 1 for amplification excited by the pumping light source 4. The amplified optical signals are branched by the optical coupler 2. The branched optical signals except for signal light wavelength are passed by F.Gs; (wavelength separator) 12 and ASE are inputted to the photo detector 9. Based on the information of the detected ASE level, the output level of the pumping light source 4 is controlled by the strength level comparator/pumping light source controller 10, to have the amplification factor with better or even the best gain flatness of the optical fiber for amplification. In this process, the optical amplification minimizing the difference of gain of each wavelength is implemented.

The signal lights reflected from F.Gs (wavelength separator) 12 are separated into each wavelength signal light by the wavelength optical coupler 15, and are inputted to the photo receivers 13 for the signal light monitor respectively, by which it is possible to detect the optical signal in each wavelength. Furthermore, the silent signal can be detected by the silent signal detector 14.

As clear with the above mentioned explanation, the optical amplifier for wavelength multiplex transmission in accordance with the present invention generates a pumping light to excite an optical fiber for amplification, inserts this pumping light to an optical fiber for amplification, branches the amplified optical signal by the optical fiber for amplification and separates ASE which is generated from the optical fiber for amplification spontaneously and the signal light of signal wavelength from the branched optical signal. The optical amplifier detects the strength of the ASE from the branched signal light, and controls the output of the pumping light source according to the detected strength so that the output level of the light signal becomes of an arbitrary setting. Therefore, by controlling the output level of the pumping light source, it is possible to set the amplification factor with better or even the best.

The above mentioned embodiments are suitable examples of the present invention. However, the application is not limited to these embodiments, while it is possible to meet various applications as long as it stays within the concept of the present invention.

What is claimed is:

1. An optical amplifier for wavelength multiplex transmission, comprising:

an optical fiber for amplifying input optical signals of wavelengths λ1~λn which are wavelength multiplexed, where n is an integer greater than 0;

a pumping light source for generating pumping lights to excite said optical fiber for amplification;

a wavelength optical multiplexer for inserting said pumping lights to said optical fiber for amplification;

an optical coupler for branching the amplified optical signals by said optical fiber for amplification;

a wavelength separator for separating both amplified spontaneous emission light which is generated spontaneously by said optical fiber for amplification and signal lights of signal wavelength from said branched optical signals;

a photo receiver for detecting the strength of said amplified spontaneous emission light;

a photo detector for detecting the strength of said signal lights; and a strength level comparator/pumping light source controller which controls the output of the pumping light source to have the output level of said optical signals set arbitrarily, based on the strength detected by said photo detector, the optical amplifier for wavelength multiplex transmission being capable of controlling the output level of said pumping light source, by said strength level comparator/pumping light source controller so as to have an amplification factor with a suitable gain flatness.

2. An optical amplifier for wavelength multiplex transmission in accordance with claim 1, wherein by the strength detected from said photo detector, said strength level comparator/pumping light source controller is capable of detecting the strength level of an optional wavelength light signal.

3. An optical amplifier for wavelength multiplex transmission in accordance with claim 1, further comprising a silent signal detector for detecting the silent state, which is capable of detecting a silent signal of an optional wavelength.

4. An optical amplifier for wavelength multiplex transmission in accordance with claim 2, further comprising a silent signal detector for detecting the silent state, which is capable of detecting a silent signal of an optional wavelength.

5. An optical amplifier for wavelength multiplex transmission in accordance with claim 3, wherein the detection of a silent signal of an optional wavelength is the detection of a silent signal of the amplified spontaneous emission light.

6. An optical amplifier for wavelength multiplex transmission in accordance with claim 1, wherein said strength level comparator/pumping light source controller controls the output level of said pumping light source, so as to have an amplification factor with a suitable gain flatness of said optical fiber for amplification.

7. An optical amplifier for wavelength multiplex transmission in accordance with claim 1, wherein comprising at least two of each said wavelength separator of different wavelength characteristics and said photo receiver, which is capable of reducing the gain difference of each different wavelength.

* * * * *